US012472982B2

(12) United States Patent
Fujimura et al.

(10) Patent No.: US 12,472,982 B2
(45) Date of Patent: Nov. 18, 2025

(54) MOBILE OBJECT CONTROL DEVICE, MOBILE OBJECT CONTROL METHOD, AND PROGRAM

(71) Applicant: HONDA MOTOR CO., LTD., Tokyo (JP)

(72) Inventors: Kotaro Fujimura, Wako (JP); Atsushi Kato, Wako (JP); Yuji Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 134 days.

(21) Appl. No.: 18/372,714

(22) Filed: Sep. 26, 2023

(65) Prior Publication Data

US 2024/0101152 A1  Mar. 28, 2024

(30) Foreign Application Priority Data

Sep. 27, 2022  (JP) ................. 2022-153282

(51) Int. Cl.
*B60W 60/00* (2020.01)
*B60W 30/09* (2012.01)
(Continued)

(52) U.S. Cl.
CPC ........ *B60W 60/0011* (2020.02); *B60W 30/09* (2013.01); *B60W 30/0956* (2013.01);
(Continued)

(58) Field of Classification Search
CPC ............. B60W 60/0011; B60W 30/09; B60W 30/0956; B60W 40/105; B60W 50/0097;
(Continued)

(56) References Cited

U.S. PATENT DOCUMENTS 12,087,065 B2 *  9/2024  Matsunaga .......... G06V 20/588
2014/0244114 A1  8/2014  Matsubara
(Continued)

FOREIGN PATENT DOCUMENTS

JP  2002-091565   3/2002
JP  2018-197048   12/2018
(Continued)

OTHER PUBLICATIONS

Japanese Office Action for Japanese Patent Application No. 2022-153282 mailed Sep. 2, 2025.

*Primary Examiner* — Jason Holloway
(74) *Attorney, Agent, or Firm* — Amin, Turocy & Watson, LLP (57) ABSTRACT

Provided is a mobile object control device configured to: recognize a surrounding situation of a mobile object; set, based on the recognized surrounding situation, a risk area in which positions of the surrounding situation are associated with risk values that are indicator values indicating degrees to which the mobile object is to avoid traveling; generate a target trajectory indicating a route along which the mobile object is to travel in the future; cause the mobile object to travel along the generated target trajectory; and set at least one observation point in each of three or more provisional trajectories branching at a specific location ahead of the mobile object, and generate the target trajectory based on the risk area and the at least one observation point.

11 Claims, 7 Drawing Sheets

(51) Int. Cl.
*B60W 30/095* (2012.01)
*B60W 40/105* (2012.01)
*B60W 50/00* (2006.01)

(52) U.S. Cl.
CPC ...... *B60W 40/105* (2013.01); *B60W 50/0097* (2013.01); *B60W 60/0015* (2020.02)

(58) Field of Classification Search
CPC ......... B60W 60/0015; B60W 30/0953; B60W 60/00272; B60W 2554/4029; B60W 2554/4042; B60W 2554/4045; B60W 60/0017
See application file for complete search history.

(56) References Cited

U.S. PATENT DOCUMENTS

| | | | |
|---|---|---|---|
| 2017/0162049 A1 | 6/2017 | Lee | |
| 2019/0329766 A1* | 10/2019 | Ishioka | B60W 30/09 |
| 2021/0003410 A1 | 1/2021 | Takeuchi et al. | |
| 2021/0300351 A1* | 9/2021 | Kumano | B60W 50/14 |
| 2022/0234577 A1 | 7/2022 | Baba et al. | |

FOREIGN PATENT DOCUMENTS

| | | |
|---|---|---|
| JP | 2022-113949 | 8/2022 |
| WO | 2013/051081 | 4/2013 |
| WO | 2019/186617 | 10/2019 |

\* cited by examiner

MOBILE OBJECT CONTROL DEVICE, MOBILE OBJECT CONTROL METHOD, AND PROGRAM

CROSS-REFERENCE TO RELATED APPLICATION

The application is based on Japanese Patent Application No. 2022-153282 filed on Sep. 27, 2022, the content of which is incorporated herein by reference.

BACKGROUND

Field of the Invention

The present invention relates to a mobile object control device, a mobile object control method, and a program.

Description of Related Art

Conventionally, techniques are known for identifying obstacles present in the travel direction of a mobile object and controlling travel of the mobile object to avoid the identified obstacles. For example, in Japanese Patent Application Publication No. 2018-197048, a method is described where image information captured by a camera mounted on a vehicle is used to set different costs for the surrounding areas of the vehicle and generate a target trajectory for the vehicle in such a way that the cost is minimized.

However, in conventional techniques, during the process of exploring the target trajectory to minimize the cost, the target trajectory can sometimes fall into a local minimum, preventing the generation of a target trajectory optimal for the mobile object.

SUMMARY

The present invention has been made in view of the above-mentioned circumstances, and has an object to provide a mobile object control device, a mobile object control method, and a program that are capable of generating a target trajectory optimal for a mobile object.

The mobile object control device, the mobile object control method, and the program according to the present invention adopt the following configuration.

(1): A mobile object control device according to one aspect of the present invention is a mobile object control device including a storage medium storing computer-readable commands, and a processor connected to the storage medium, the processor being configured to execute the computer-readable commands to: recognize a surrounding situation of a mobile object; set, based on the recognized surrounding situation, a risk area in which positions of the surrounding situation are associated with risk values that are indicator values indicating degrees to which the mobile object is to avoid traveling; generate a target trajectory indicating a route along which the mobile object is to travel in the future; cause the mobile object to travel along the generated target trajectory; and set at least one observation point in each of three or more provisional trajectories branching at a specific location ahead of the mobile object, and generate the target trajectory based on the risk area and the at least one observation point.

(2): In the aspect (1), the processor sets, as the three or more provisional trajectories, at least one provisional trajectory in a travel direction of the mobile object and two provisional trajectories on left and right sides with respect to the travel direction.

(3): In the aspect (2), the processor generates the two left and right provisional trajectories as arcs with respect to the provisional trajectory set in the travel direction of the mobile object.

(4): In the aspect (3), the processor changes lengths of the arcs according to a speed of the mobile object.

(5): In the aspect (1), the processor determines, from among the three or more provisional trajectories as the target trajectory based on the set risk area, a provisional trajectory including an observation point having the smallest risk value among the at least one observation point.

(6): In the aspect (5), the processor repeats the cycle of setting the determined target trajectory as a center provisional trajectory of the three or more provisional trajectories and generating left and right provisional trajectories of the three or more provisional trajectories from the set center provisional trajectory.

(7): In the aspect (5), the risk value of the center provisional trajectory of the three or more provisional trajectories is multiplied by a coefficient for reducing the risk value, and the processor determines, from among the three or more provisional trajectories as the target trajectory based on the set risk area, a provisional trajectory including an observation point having the smallest risk value among the at least one observation point.

(8): In the aspect (5), the processor determines the center provisional trajectory as the target trajectory if the curvature of the center provisional trajectory among the three or more provisional trajectories is equal to or smaller than a threshold value.

(9): A mobile object control device according to another aspect of the present invention is a mobile object control device including a storage medium storing computer-readable commands, and a processor connected to the storage medium, the processor being configured to execute the computer-readable commands to: recognize a surrounding situation of a mobile object; set, based on the recognized surrounding situation, a risk area in which positions of the surrounding situation are associated with risk values that are indicator values indicating degrees to which the mobile object is to avoid traveling; generate a target trajectory indicating a route along which the mobile object is to travel in the future; cause the mobile object to travel along the generated target trajectory; and set one observation point in a travel direction of the mobile object and two observation points on left and right sides with respect to the travel direction of the mobile object, and generates the target trajectory based on the risk area and the observation points.

(10): A mobile object control method according to another aspect of the present invention is a mobile object control method to be executed by a computer, the mobile object control method including: recognizing a surrounding situation of a mobile object; setting, based on the recognized surrounding situation, a risk area in which positions of the surrounding situation are associated with risk values that are indicator values indicating degrees to which the mobile object is to avoid traveling; generating a target trajectory indicating a route along which the mobile object is to travel in future; causing the mobile object to travel along the generated target trajectory; and setting at least one observation point in each of three or more provisional trajectories branching at a specific location ahead of the mobile object, and generate the target trajectory based on the risk area and the at least one observation point.

(11): A program according to another aspect of the present invention is a program for causing a computer to: recognize a surrounding situation of a mobile object; set, based on the recognized surrounding situation, a risk area in which positions of the surrounding situation are associated with risk values that are indicator values indicating degrees to which the mobile object is to avoid traveling; generate a target trajectory indicating a route along which the mobile object is to travel in the future; cause the mobile object to travel along the generated target trajectory; and set at least one observation point in each of three or more provisional trajectories branching at a specific location ahead of the mobile object, and generate the target trajectory based on the risk area and the at least one observation point.

According to the aspects (1) to (11), it is possible to generate a target trajectory optimal for a mobile object.

DESCRIPTION OF EMBODIMENTS

Now, a mobile object control device, a mobile object control method, and a storage medium according to an embodiment of the present invention are described with reference to the drawings. The mobile object in the present invention refers to, for example, a four-wheeled vehicle, a two-wheeled vehicle, micro mobility, or a robot. In the following description, it is assumed that the mobile object is a four-wheeled vehicle.

Overall Configuration

Figure 1:
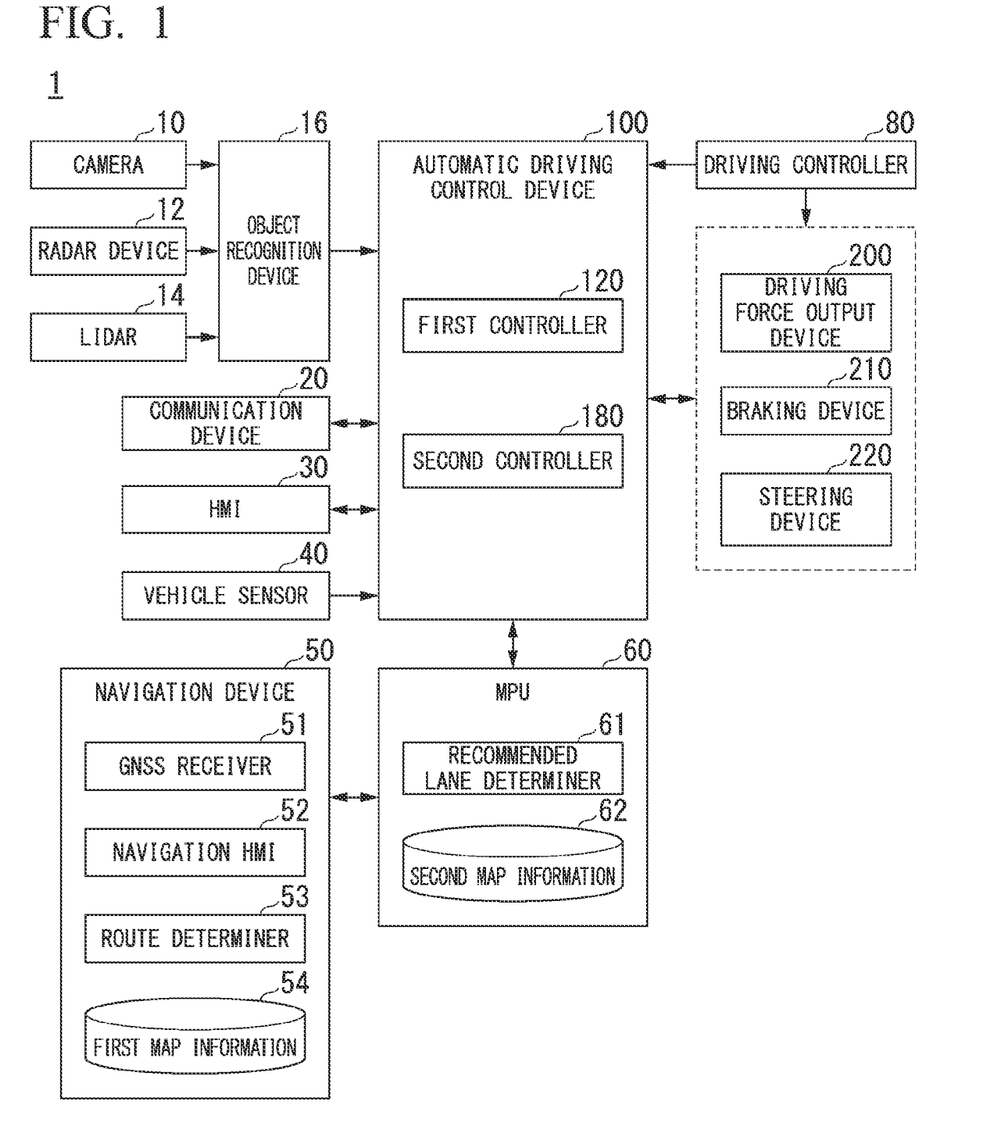
FIG. 1 is a configuration diagram of a vehicle system 1 that uses a mobile object control device according to an embodiment.

FIG. 1 is a configuration diagram of a vehicle system 1 that uses a mobile object control device according to an embodiment. A vehicle including the vehicle system 1 is, for example, a vehicle such as a two-wheeled vehicle, a three-wheeled vehicle, or a four-wheeled vehicle, and its power source is an internal combustion engine such as a diesel engine or a gasoline engine, an electric motor, or a combination thereof. The electric motor operates by using power generated by a generator connected to the internal combustion engine or power discharged by a secondary battery or a fuel cell.

The vehicle system 1 includes, for example, a camera 10, a radar device 12, a LIDAR (Light Detection and Ranging) device 14, an object recognition device 16, a communication device 20, an HMI (Human Machine Interface) 30, a vehicle sensor 40, a navigation device 50, an MPU (Map Positioning Unit) 60, a driving controller 80, an automatic driving control device 100, a driving force output device 200, a braking device 210, and a steering device 220. These devices and instruments are connected to one another via, for example, a wireless communication line, a serial communication line, or a multiplex communication line such as a CAN (Controller Area Network) communication line. The configuration illustrated in FIG. 1 is only one example, and a part of the configuration may be omitted, or another configuration may be added.

The camera 10 is, for example, a digital camera that uses a solid image pickup device such as a CCD (Charge Coupled Device) or a CMOS (Complementary Metal Oxide Semiconductor). The camera 10 is mounted on any part of a vehicle (hereinafter referred to as "host vehicle M") including the vehicle system 1. When the camera 10 picks up a front image, the camera 10 is mounted on, for example, an upper part of a front windshield or a back surface of a rear-view mirror. The camera 10 repeatedly photographs the surroundings of the host vehicle M periodically, for example. The camera 10 may be a stereo camera.

The radar device 12 radiates a radio wave such as a millimeter wave toward the surroundings of the host vehicle M, and detects a radio wave (reflected wave) reflected by an object, to detect at least the position (distance and direction) of the object. The radar device 12 is mounted on any part of the host vehicle M. The radar device 12 may detect the position and speed of the object by an FM-CW (Frequency Modulated Continuous Wave) method.

The LIDAR 14 radiates light (or electromagnetic wave having a wavelength close to light) toward the surroundings of the host vehicle M, and measures diffused light. The LIDAR 14 detects a distance to a target based on a period of time since emission of light until reception of light. The light to be radiated is, for example, pulsed laser light. The LIDAR 14 is mounted on any part of the host vehicle M.

The object recognition device 16 executes sensor fusion processing for results of detection by a part or all of the camera 10, the radar device 12, and the LIDAR 14, to thereby recognize a position, a type, and a speed of an object, for example. The object recognition device 16 outputs the recognition result to the automatic driving control device 100. The object recognition device 16 may output the results of detection by the camera 10, the radar device 12, and the LIDAR 14 to the automatic driving control device 100 as they are.

The communication device 20 uses, for example, a cellular network, a Wi-Fi network, Bluetooth (trademark), or DSRC (Dedicated Short Range Communication) to communicate with another vehicle existing near the host vehicle M or communicate with various kinds of server devices via a radio base station.

The HMI 30 presents various kinds of information to an occupant of the host vehicle M, and receives input of an operation by the occupant. The HMI 30 includes, for example, various kinds of display devices, speakers, buzzers, touch panels, switches, and keys.

The vehicle sensor 40 includes, for example, a vehicle speed sensor that detects a speed of the host vehicle M, an acceleration sensor that detects an acceleration, a yaw rate sensor that detects an angular speed with respect to a vertical axis, and an orientation sensor that detects an orientation of the host vehicle M.

The navigation device 50 includes, for example, a GNSS (Global Navigation Satellite System) receiver 51, a navigation HMI 52, and a route determiner 53. The navigation device 50 holds first map information 54 in a storage device such as an HDD (Hard Disk Drive) or a flash memory. The GNSS receiver 51 identifies the position of the host vehicle M based on a signal received from a GNSS satellite. The position of the host vehicle M may be identified or complemented by an INS (Inertial Navigation System) that uses output of the vehicle sensor 40. The navigation HMI 52 includes, for example, a display device, a speaker, a touch panel, and a key. The navigation HMI 52 and the HMI 30 described above may be integrated partially or completely. The route determiner 53 refers to the first map information 54 to determine a route (hereinafter referred to as "map route") from the position (or any input position) of the host vehicle M identified by the GNSS receiver 51 to a destination input by an occupant by using the navigation HMI 52, for example. The first map information 54 is, for example, information representing road structure by a link indicating a road and nodes connected by the link. The first map information 54 may include, for example, a curvature of a road and POI (Point Of Interest) information. The map route is output to the MPU 60. The navigation device 50 may guide a route by using the navigation HMI 52 based on the map route. The navigation device 50 may be implemented by, for example, the function of a terminal device such as a smartphone or a tablet terminal held by the occupant. The navigation device 50 may transmit the current position and the destination to a navigation server via the communication device 20, and acquire a route similar to the map route from the navigation server.

The MPU 60 includes, for example, a recommended lane determiner 61, and holds second map information 62 in a storage device such as an HDD or a flash memory. The recommended lane determiner 61 divides the map route provided by the navigation device 50 into a plurality of blocks (for example, at intervals of 100 [m] with respect to a vehicle travel direction), and determines a recommended route for each block with reference to the second map information 62. The recommended lane determiner 61 determines on which lane the host vehicle M is to travel. When there is a junction on a map route, the recommended lane determiner 61 determines a recommended route so that the host vehicle M can travel on a route for efficiently entering the junction.

The second map information 62 is map information having higher precision than that of the first map information 54. The second map information 62 includes, for example, information on the center of a lane or information on the boundary of a lane. The second map information 62 may further include, for example, road information, traffic regulation information, address information (address or postal code), facility information, phone number information, and information on a section in which a mode A or mode B described later is prohibited. The second map information 62 may be updated appropriately through communication between the communication device 20 and another device.

The driving controller 80 includes, for example, an acceleration pedal, a brake pedal, a gear shift, and other controllers. A sensor that detects an operation amount or whether an operation is applied is mounted on the driving controller 80, and the detection result is output to the automatic driving control device 100 or a part or all of the driving force output device 200, the braking device 210, and the steering device 220.

The automatic driving control device 100 includes, for example, a first controller 120 and a second controller 160. The first controller 120 and the second controller 160 are each implemented by a hardware processor such as a CPU (Central Processing Unit) executing a program (software). A part or all of the components may be implemented by hardware (circuit; including circuitry) such as an LSI (Large Scale Integration), an ASIC (Application Specific Integrated Circuit), an FPGA (Field-Programmable Gate Array), or a GPU (Graphics Processing Unit), or may be implemented by cooperation between software and hardware. The program may be stored in advance in a storage device (storage device including a non-transitory storage medium) of the automatic driving control device 100 such as an HDD or a flash memory, or the program may be stored in a removable storage medium such as a DVD or a CD-ROM. Then, the storage medium (non-transitory storage medium) may be mounted on a drive device so that the program is installed into an HDD or a flash memory of the automatic driving control device 100.

Figure 2:
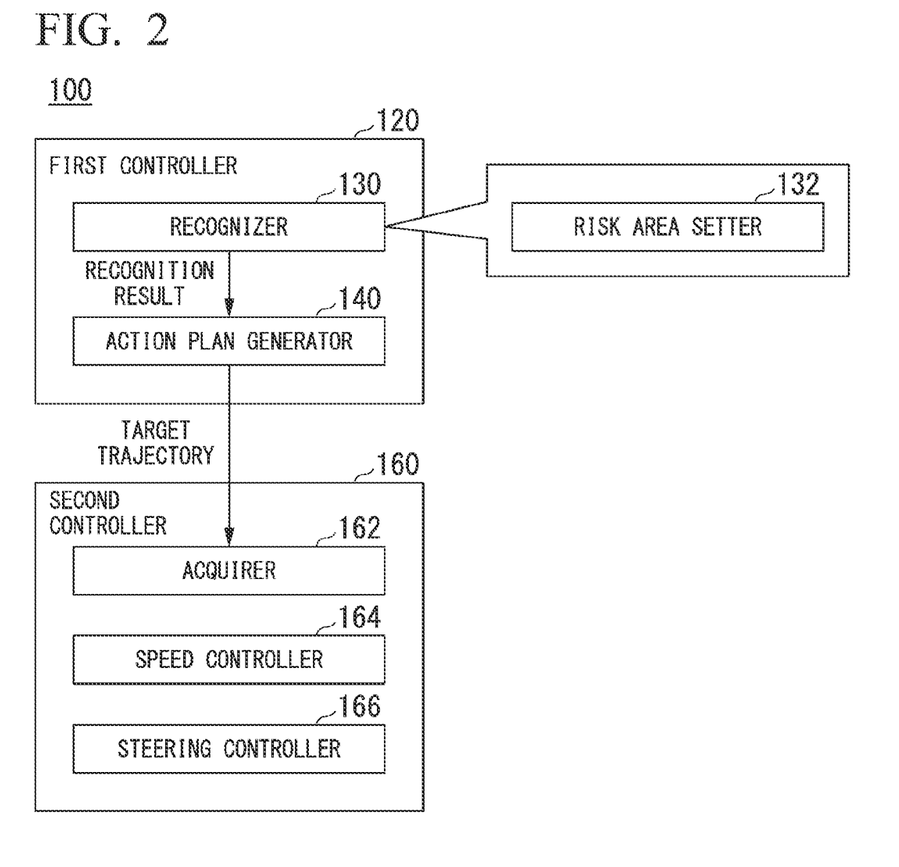
FIG. 2 is a functional configuration diagram of a first controller and a second controller.

FIG. 2 is a functional configuration diagram of the first controller 120 and the second controller 160. The first controller 120 includes, for example, a recognizer 130 and an action plan generator 140. The first controller 120 implements, for example, the function of AI (Artificial Intelligence) and the function of a model given in advance in parallel. For example, the function of "recognizing an intersection" may be implemented by executing recognition of an intersection by, for example, deep learning, and recognition based on a condition (including, for example, a signal adapted for pattern matching and a road sign) given in advance in parallel, giving scores to both of the recognitions, and giving an integrated evaluation. The reliability of automatic driving is ensured in this manner. The first controller 120 is an example of "mobile object control device".

The recognizer 130 recognizes states such as the position, speed, and acceleration of an object near the host vehicle M based on information input from the camera 10, the radar device 12, and the LIDAR 14 via the object recognition device 16. The position of an object is, for example, recognized as a position in an absolute coordinate system with respect to a representative point (for example, center of gravity or center of drive axis) of the host vehicle M to be used for control. The position of an object may be represented by a representative point such as a center of gravity or corner of the object, or may be represented by a region. The "state" of an object may include the acceleration, jerk, or "action state" (for example, whether or not the host vehicle M is changing a lane or is trying to change a lane) of the object.

The recognizer 130 recognizes, for example, a lane (travel lane) on which the host vehicle M is traveling. For example, the recognizer 130 recognizes the travel lane by comparing a pattern (for example, arrangement of solid lines and broken lines) of a road division line obtained from the second map information 62 with a pattern of a road division line near the host vehicle M recognized from the image photographed by the camera 10, to thereby recognize the travel lane. In addition to the road division line, the recognizer 130 may recognize the travel lane by recognizing a travel path boundary (road boundary) including, for example, a road division line, the shoulder of a road, a curb, a center median, and a guardrail. In this recognition, the position of the host vehicle M acquired from the navigation device 50 or the result of processing by the INS may be considered. The recognizer 130 recognizes a stop line, an obstacle, red light, a toll gate, and other road events.

The recognizer 130 recognizes the position or posture of the host vehicle M with respect to a travel lane when recognizing the travel lane. The recognizer 130 may recognize, for example, as the relative position and posture of the host vehicle M with respect to the travel lane, a deviation of the reference point of the host vehicle M from the center of the lane and an angle with respect to a line obtained by connecting the centers of the lane in the travel direction of the host vehicle M. Instead, the recognizer 130 may recognize, for example, the position of the reference point of the host vehicle M with respect to any side edge (road division line or road boundary) of the travel lane as the relative position of the host vehicle M with respect to the travel lane. In this embodiment, the recognizer 130 includes a risk area setter 132, the function of which is described later in detail.

The action plan generator 140 generates a target trajectory in which the host vehicle M is to travel in the future (without depending on an operation performed by the driver) automatically so as to be capable of traveling on a recommended lane determined by the recommended lane determiner 61 in principle and coping with the surrounding situation of the host vehicle M. The target trajectory includes, for example, a speed component. For example, the target trajectory is represented by arranging the locations (trajectory points) to be reached by the host vehicle M. The trajectory points are locations to be reached by the host vehicle M at predetermined travelled distances (for example, about several meters) along the road. In addition, a target speed and a target acceleration are generated in each predetermined sampling period (for example, less than 1 second) as a part of the target trajectory. The trajectory points may be positions to be reached by the host vehicle M in each sampling period. In this case, information on the target speed and the target acceleration is represented by an interval between trajectory points.

The action plan generator 140 may set an automatic driving event when generating a target trajectory. The automatic driving event includes, for example, a constant speed traveling event, a low-speed following traveling event, a lane change event, a junction event, a merge event, and a takeover event. The action plan generator 140 generates a target trajectory that depends on an activated event. The action plan generator 140 is an example of the "target trajectory generator".

The second controller 160 controls the driving force output device 200, the braking device 210, and the steering device 220 so that the host vehicle M passes through the target trajectory generated by the action plan generator 140 as scheduled.

Referring back to FIG. 2, the second controller 160 includes, for example, an acquirer 162, a speed controller 164, and a steering controller 166. The acquirer 162 acquires information on a target trajectory (trajectory points) generated by the action plan generator 140, and stores the information into a memory (not shown). The speed controller 164 controls the driving force output device 200 or the braking device 210 based on a speed component accompanying the target trajectory stored in the memory. The steering controller 166 controls the steering device 220 depending on the degree of curve of the target trajectory stored in the memory. The processing of the speed controller 164 and the steering controller 166 is implemented by a combination of feed-forward control and feedback control. As an example, the steering controller 166 executes feed-forward control that depends on the curvature of the road in front of the host vehicle M and feedback control based on a deviation from the target trajectory.

The driving force output device 200 outputs, to a drive wheel, a traveling driving force (torque) for causing the host vehicle M to travel. The driving force output device 200 includes, for example, a combination of an internal combustion engine, an electric motor, and a transmission, and an ECU (Electronic Control Unit) configured to control these components. The ECU controls the above-mentioned components in accordance with information input from the second controller 160 or information input from the driving controller 80.

The braking device 210 includes, for example, a brake caliper, a cylinder that transmits a hydraulic pressure to the brake caliper, an electric motor that causes the hydraulic pressure in the cylinder, and a brake ECU. The brake ECU controls the electric motor in accordance with information input from the second controller 160 or information input from the driving controller 80, and causes a brake torque that depends on a braking operation to be output to each wheel. The braking device 210 may include, as a backup, a mechanism for transmitting the hydraulic pressure, which is caused by an operation of the brake pedal included in the driving controller 80, to the cylinder via a master cylinder. The configuration of the braking device 210 is not limited to the configuration described above, and the braking device 210 may be an electronic hydraulic brake device configured to control an actuator in accordance with information input from the second controller 160, and transmit the hydraulic pressure of the master cylinder to the cylinder.

The steering device 220 includes, for example, a steering ECU and an electric motor. The electric motor causes a force in a rack-and-pinion mechanism to change the orientation of a steered wheel. The steering ECU drives the electric motor in accordance with information input from the second controller 160 or information input from the driving controller 80 to change the orientation of the steered wheel.

Operation

Figure 3:
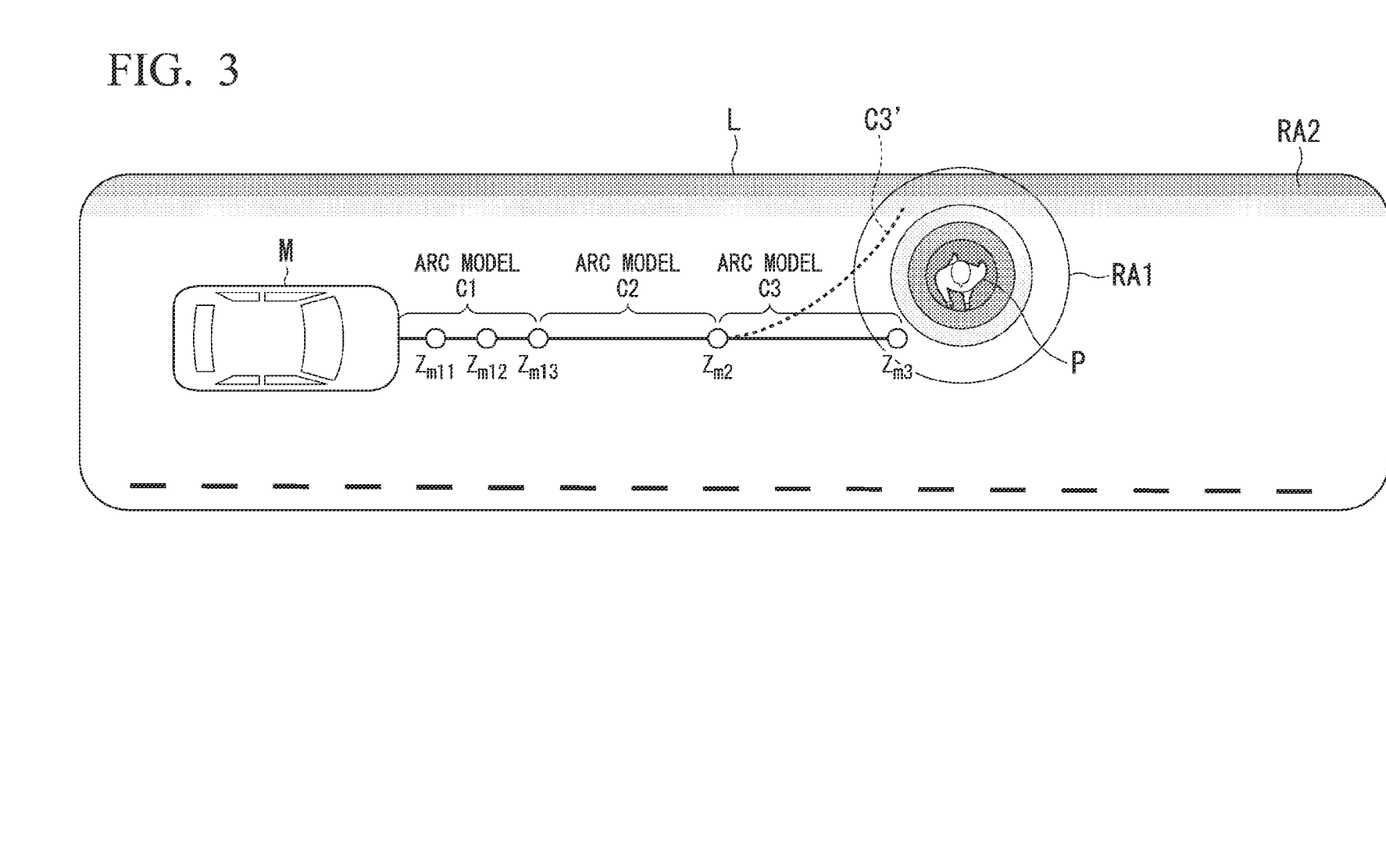
FIG. 3 is a diagram illustrating processing to be executed by a risk area setter.

Next, processing to be executed by the risk area setter 132 and the action plan generator 140 is described. FIG. 3 is a diagram illustrating the processing to be executed by the risk area setter 132. In FIG. 3, the reference symbol P represents a pedestrian, the symbol L represents the road boundaries of the lane in which the host vehicle M is traveling, and symbols RA1 and RA2 represent the risk areas set by the risk area setter 132.

The risk area setter 132 sets, based on the surrounding situation of the host vehicle M recognized by the recognizer 130, a risk area RA in which positions of the surrounding situation are associated with risk values that are indicator values indicating degrees to which the mobile object is to avoid traveling. More specifically, the risk area setter 132 identifies different types of objects in the vicinity of the host vehicle M and sets risk values R for the surrounding areas of these identified objects, with larger values (i.e., negative values) being assigned to areas closer to the identified objects. For example, in the case of FIG. 3, the risk area setter 132 sets the risk area RA1 as a circular area centered around an occupant P, where the risk value R increases as the position gets closer to the occupant P. Furthermore, in FIG. 3, the risk area setter 132 sets the risk area RA2 as a gradient area where the risk value R increases as the position gets closer to a road boundary L.

The action plan generator 140 calculates a risk value for each trajectory point that makes up the target trajectory and modifies the target trajectory when the total calculated risk value is equal to or larger than a threshold value such that the target trajectory results in the total calculated risk value being smaller than the threshold value. For example, in the case of FIG. 3, the action plan generator 140 calculates a risk value for each trajectory point that makes up the target trajectory generated by connecting arc models C1 (including trajectory points Zm11, Zm12, Zm13, for example), C2 (including trajectory point Zm2, for example), and C3 (including trajectory point Zm3, for example). When the total calculated risk value is equal to or larger than the threshold value, the action plan generator 140 modifies the target trajectory. More specifically, for instance, the action plan generator 140 iteratively adjusts the curvature of each arc model until the total calculated risk value is smaller than the threshold, to thereby modify the target trajectory.

However, when using the technique illustrated in FIG. 3 as described above, there may be cases where the target trajectory gets stuck in a local minimum during the iterative adjustment of the curvature of each arc model, and a globally optimal target trajectory may not necessarily be obtained. For example, in the case of FIG. 3, by adjusting the curvature of the arc model C3 to decrease the risk value of trajectory point Zm3, the arc model C3 may be modified to C3', allowing it to pass through the space between the pedestrian P and the road boundary L. However, in this case, the vehicle M is controlled to travel through a very narrow space between the pedestrian P and the road boundary L, which is undesirable. Against this background, in this embodiment, the action plan generator 140 generates a plurality of provisional trajectories for arc models C2 and C3 with respect to the end point Zm13 of arc model C1, and then selects, as the target trajectory, a provisional trajectory having the smallest sum of risk values calculated for respective trajectory points on the generated provisional trajectories.

Figure 4:
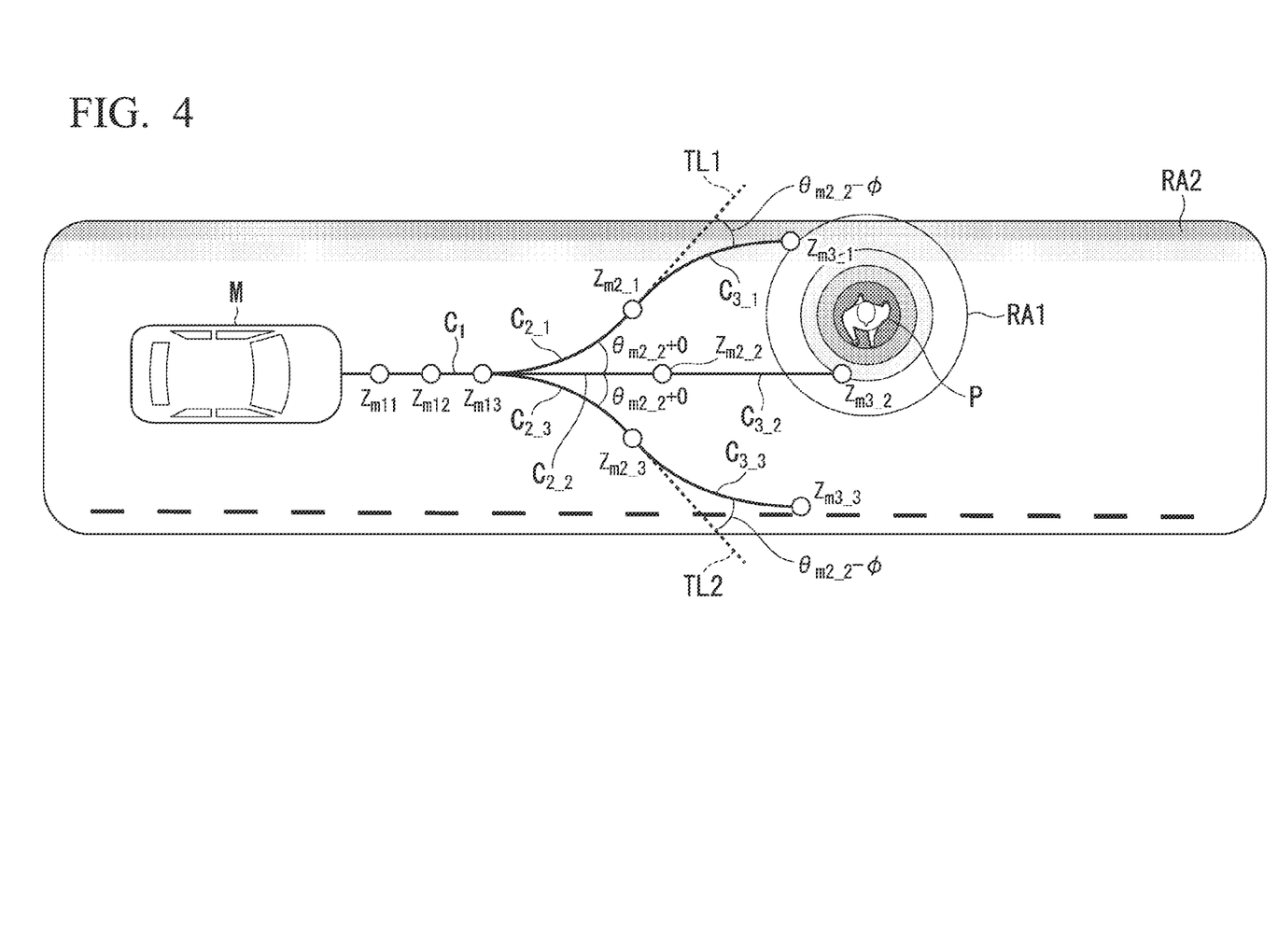
FIG. 4 is a diagram for describing processing to be executed by an action plan generator.

FIG. 4 is a diagram for describing processing to be executed by the action plan generator 140. In FIG. 4, symbols C2_1, C2_2, C2_3 represent provisional trajectories for the arc model C2, and symbols C3_1, C3_2, C3_3 represent provisional trajectories for the arc model C3. As illustrated in FIG. 4, the action plan generator 140 generates three provisional trajectories of the target trajectory. These include: a first provisional trajectory TT1, which connects the arc model C1, the arc model C2_1, and the arc model C3_1; a second provisional trajectory TT2, which connects the arc model C1, the arc model C2_2, and the arc model C3_2; and a third provisional trajectory TT3, which connects the arc model C1, the arc model C2_3, and the arc model C3_3. The provisional trajectory TT1 includes trajectory points Zm11, Zm12, Zm13, Zm2_1, and Zm3_1, the provisional trajectory TT2 includes trajectory points Zm11, Zm12, Zm13, Zm2_2, and Zm3_2, and the provisional trajectory points Zm11, Zm12, Zm13, Zm2_3, and Zm3_3. In this way, the action plan generator 140 sets three or more provisional trajectories branching at a predetermined location ahead of the host vehicle M (i.e., trajectory point Zm13), calculates the sum of risk values calculated for respective trajectory points (example of "observation point") on the set provisional trajectories, and determines a provisional trajectory having the smallest sum of risk values as the target trajectory. Setting of a provisional trajectory is described below more in detail.

First, the action plan generator 140 rotates the trajectory point Zm2_2 of the central provisional trajectory TT2 (which may be the same as the conventional provisional trajectory shown in FIG. 3 or the target trajectory obtained in the previous control cycle) by a predetermined angle θm2_2+Φ, both left and right, with respect to the second arc model C2_2. Here, Φ is an offset value. The action plan generator 140 sets a trajectory point obtained by rotating the trajectory point Zm2_2 by a predetermined angle θm2_2+Φ to the left with respect to the second arc model C2_2 as a trajectory point Zm2_1, and sets a trajectory point obtained by rotating the trajectory point Zm2_2 by a predetermined angle θm2_2+Φ to the right with respect to the second arc model C2_2 as a trajectory point Zm2_3. The action plan generator 140 then connects the trajectory point Zm13 with the set trajectory point Zm2_1 to generate the arc model C2_1, and connects the trajectory point Zm13 with the set trajectory point Zm2_3 to generate the arc model C2_3.

First, the action plan generator 140 rotates the trajectory point Zm2_2 of the central provisional trajectory TT2 (which may be the same as the conventional provisional trajectory shown in FIG. 3 or the target trajectory from the previous control cycle) by a predetermined angle θm2_2+Φ, both left and right, with respect to the second arc model C2_2 as a reference. Here, Φ is an offset value. The action plan generator 140 sets, as the trajectory point Zm2_1, a trajectory point obtained by rotating the trajectory point Zm2_2 by a predetermined angle θm2_2+Φ to the left with respect to the second arc model C2_2, and sets, as the trajectory point Zm2_3, a trajectory point obtained by rotating the trajectory point Zm2_2 by a predetermined angle θm2_2+Φ to the right with respect to the second arc model C2_2. The action plan generator 140 then connects the trajectory point Zm13 with the set trajectory point Zm2_1 to generate an arc model C2_1, and connects the trajectory point Zm13 with the set trajectory point Zm2_3 to generate an arc model C2_3.

The provisional trajectory TT2, used as a reference to generate provisional trajectories TT1 and TT3 as described above, is a provisional trajectory extending in the direction of travel of the host vehicle M. The provisional trajectory TT1 extends vertically and to the left of the host vehicle M in relation to this direction of travel, while the provisional trajectory TT3 extends vertically and to the right of the host vehicle M in relation to this direction of travel. In other words, the action plan generator 140 generates three or more provisional trajectories in different directions based on the trajectory point Zm13 as a reference point. Among the generated provisional trajectories, the action plan generator 140 determines a provisional trajectory having the smallest sum of risk values as the target trajectory. As a result, it is possible to reduce the likelihood of the target trajectory reaching a local minimum and generate a globally optimal target trajectory for the host vehicle M.

Figure 5:
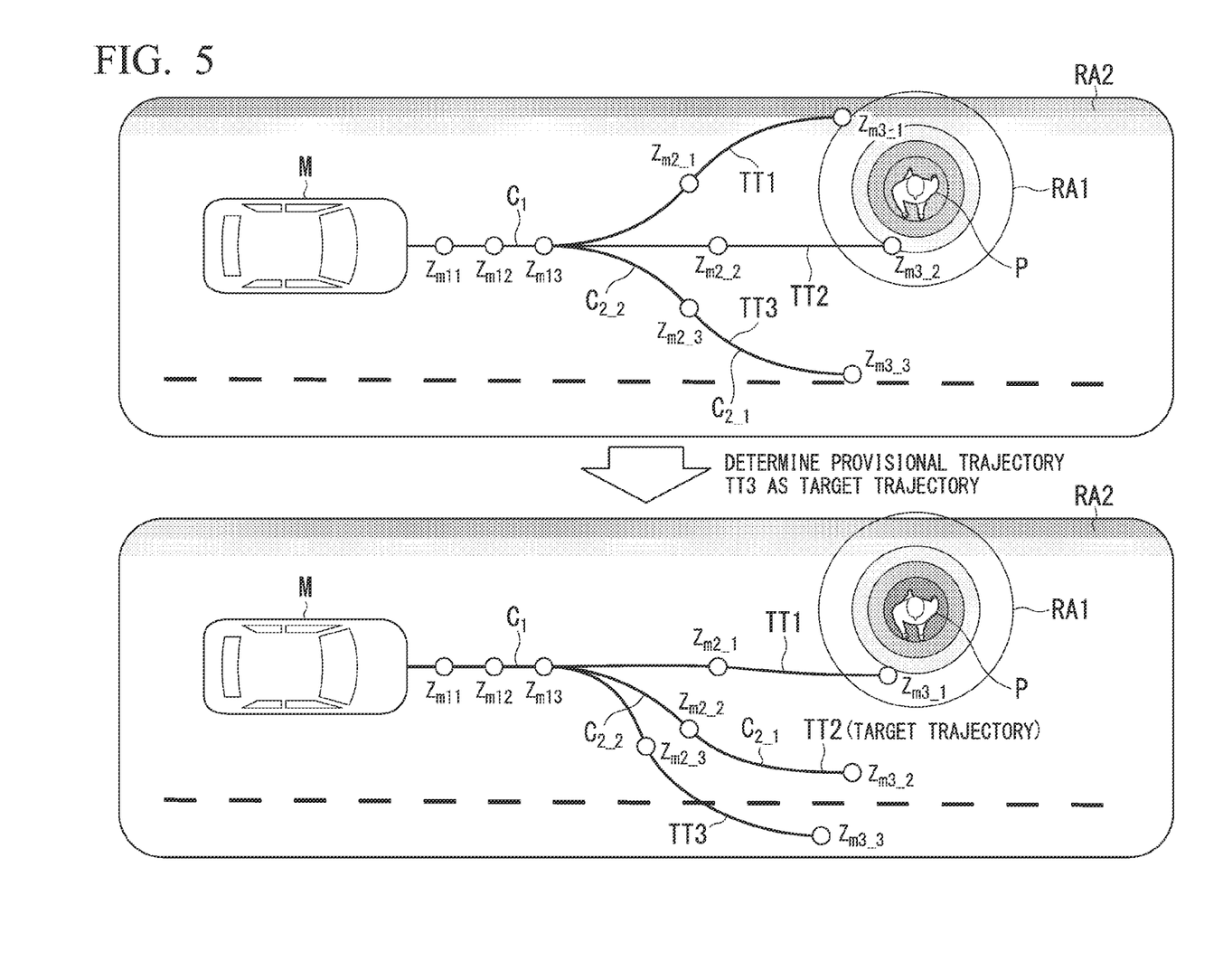
FIG. 5 is a diagram illustrating an example of a target trajectory determined by the action plan generator.

FIG. 5 is a diagram illustrating an example of the target trajectory determined by the action plan generator 140. In the situation illustrated in the upper part of FIG. 5, the risk values calculated for the trajectory points Zm3_1 included in the provisional trajectory TT1 and the trajectory point Zm3_2 included in the provisional trajectory TT2 are both positive, whereas the risk values calculated for the trajectory points Zm11, Zm12, Zm13, Zm2_3, and Zm3_3 included in the provisional trajectory TT3 are zero. Therefore, the action plan generator 140 identifies the provisional trajectory TT3 as a provisional trajectory having the smallest sum of risk values, and determines the provisional trajectory TT3 as the target trajectory.

The action plan generator 140 sets the provisional trajectory, which has been determined as the target trajectory, as the central provisional trajectory for the next control cycle. Specifically, as shown in the lower part of FIG. 5, the action plan generator 140 sets the provisional trajectory TT3, which has been determined as the target trajectory, as the central provisional trajectory TT2 for the next control cycle. Accordingly, the action plan generator 140 generates new provisional trajectories TT1 and TT3 by rotating the trajectory point of the newly set provisional trajectory TT2 by a predetermined angle θm2_2+Φ in the left and right directions, as mentioned above. Then, the action plan generator 140 arranges inverted arc models C2_1 and C2_3 (i.e., arc models C3_1 and C3_3) at positions where the angle formed with tangents TL1 and TL2 of the arc models C2_1 and C2_3 is equal to a predetermined angle θm2_2−Φ, to thereby obtain new provisional trajectories TT1 and TT3.

Figure 6:
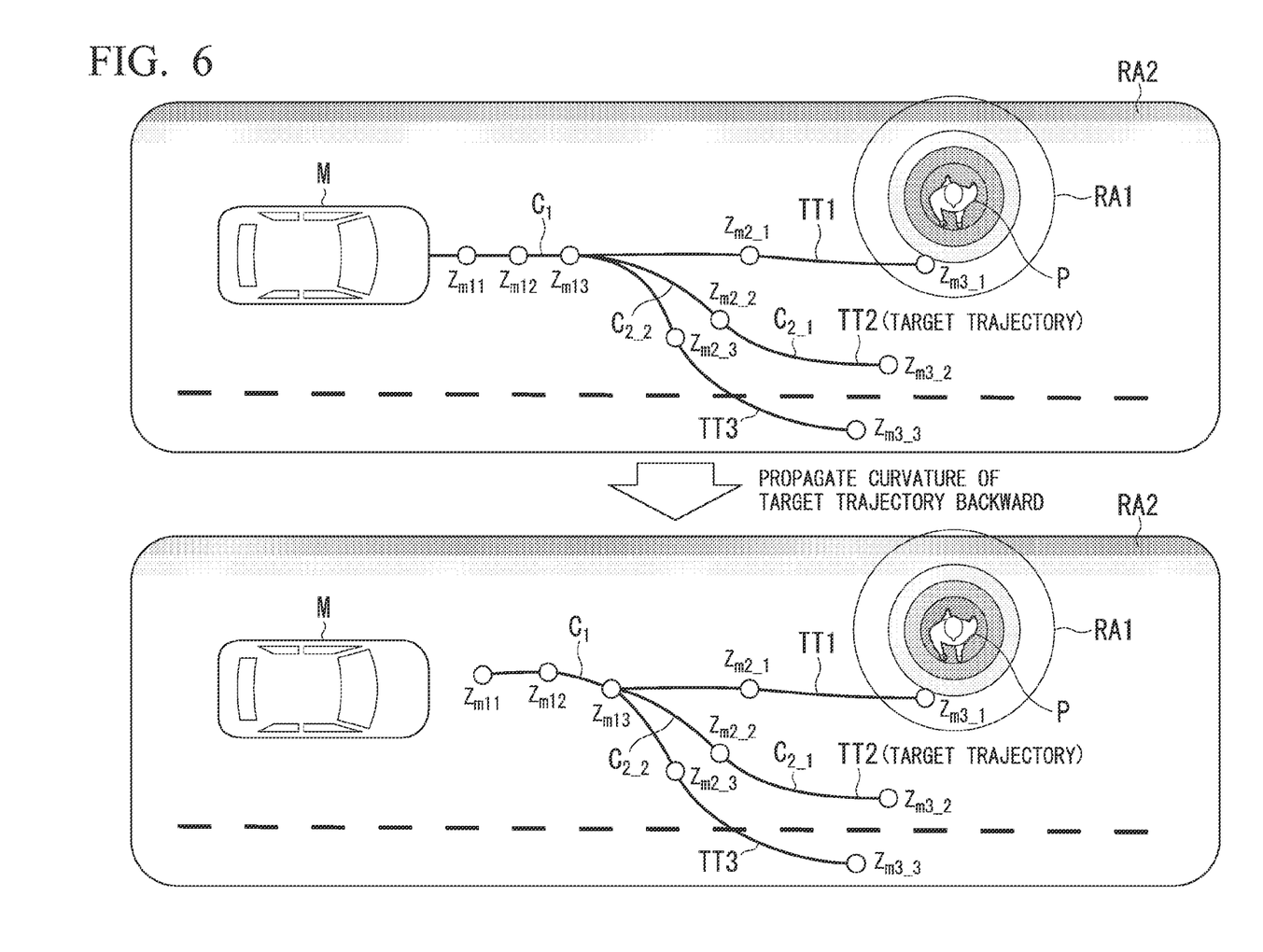
FIG. 6 is a diagram illustrating an example of a curvature propagated backward in response to determination of the target trajectory.

The action plan generator 140 simultaneously corrects the provisional trajectory determined as the target trajectory by propagating the curvature of the arc model that makes up the provisional trajectory backward. FIG. 6 is a diagram illustrating an example of the curvature propagated backward in response to determination of the target trajectory. The upper part of FIG. 6 represents the same scene as the lower part of FIG. 5. In this case, the action plan generator 140, as shown in the lower part of FIG. 6, propagates the curvature of the arc C2_2 that makes up the target trajectory TT2 to the curvature of the subsequent arc (i.e., arc C1). Here, propagation means adjusting (bringing closer) the curvature of the subsequent arc (i.e., arc C1) to match the curvature of the previous arc (i.e., arc C2_2) such that the host vehicle M travels along the arc C2_2 smoothly. The action plan generator 140 obtains the definitive target trajectory TT2 in this manner. Furthermore, the action plan generator 140 may execute control such as extremum seeking control on the target trajectory TT2 to further correct the target trajectory TT2, and establish the target trajectory TT2 as the ultimate target trajectory TT2.

In the described configuration, the action plan generator 140 compares the calculated risk values for the generated provisional trajectories, and determines a provisional trajectory having the smallest sum of risk values as the target trajectory. In this configuration, the action plan generator 140 may multiply the risk value of the central provisional trajectory by a coefficient for reducing the risk value before comparing the risk values, and select, as the target trajectory, a provisional trajectory including a trajectory point having the smallest risk value. This approach is utilized because, as previously mentioned, the central provisional trajectory is defined as the target trajectory in the previous control cycle. Therefore, when the risk values for the left and right provisional trajectories are close in magnitude to the risk value of the central trajectory, it is preferable from a stability perspective to maintain the target trajectory without changing it from the previous control cycle to the current one.

Furthermore, the action plan generator 140 may, before comparing the risk values, determine whether the curvature of the central provisional trajectory is within a threshold value, and perform the risk value comparison only if it is determined that the curvature of the central provisional trajectory exceeds the threshold value. This approach is employed because when the curvature of the central provisional trajectory is within the threshold value, it implies that the risk value (specifically, the risk value in the central direction) used as a premise for generating the central provisional trajectory is low. This suggests that there is less need for the vehicle to change its trajectory, and it is preferable from a stability perspective to maintain the central provisional trajectory as the target trajectory. Therefore, alternatively, the action plan generator 140 may determine whether the risk value of the central provisional trajectory is within the threshold value, and perform the risk value comparison for other provisional trajectories only if it is determined that the risk value of the central provisional trajectory exceeds the threshold value.

Furthermore, in the above explanation, it is assumed that the length of each arc model constituting the provisional trajectory is constant. However, the present invention is not limited to such a configuration. For example, the action plan generator 140 may vary the length of each arc model based on the speed of the vehicle M. More specifically, the action plan generator 140 may increase the length of each arc model as the speed of the vehicle M increases. Conversely, as the speed of the vehicle M decreases, the action plan generator 140 may reduce the length of each arc model. This is because as the speed of the vehicle M increases, there is a need to calculate risk values for more distant points in advance. With such a configuration, it is possible to generate a target trajectory of an appropriate length based on the speed of the vehicle M.

Furthermore, in the above explanation, for the sake of simplicity, it is described how the action plan generator 140 determines the target trajectory from among the provisional trajectories based on the sum of risk values for respective trajectory points at a certain point in time. However, the present invention is not limited to such a configuration. The action plan generator 140 may also calculate the sum of risk values for respective trajectory points at multiple time points within a certain period (e.g., several seconds). In this case, similarly, the action plan generator 140 determines a provisional trajectory having the smallest sum of risk values across multiple time points as the target trajectory for that period. With such a configuration, it is possible to generate a more reliable target trajectory by calculating and comparing the risk values for respective provisional trajectories based on a larger amount of data.

Furthermore, in the above explanation, description is given of an example where the action plan generator 140 generates three provisional trajectories. However, the present invention is not limited to such a configuration. The action plan generator 140 may generate four or more provisional trajectories. In such a case, the action plan generator 140 can start by specifying a reference provisional trajectory (equivalent to the TT2 mentioned earlier), and then rotate the trajectory points of the reference provisional trajectory at intervals of a certain angle θ+Φ in both left and right directions to generate arc models. The action plan generator 140 can then arrange the inverted arc models at positions where the angle formed with tangents of the generated provisional trajectories is a predetermined angle θ−Φ, to thereby generate other provisional trajectories.

Figure 7:
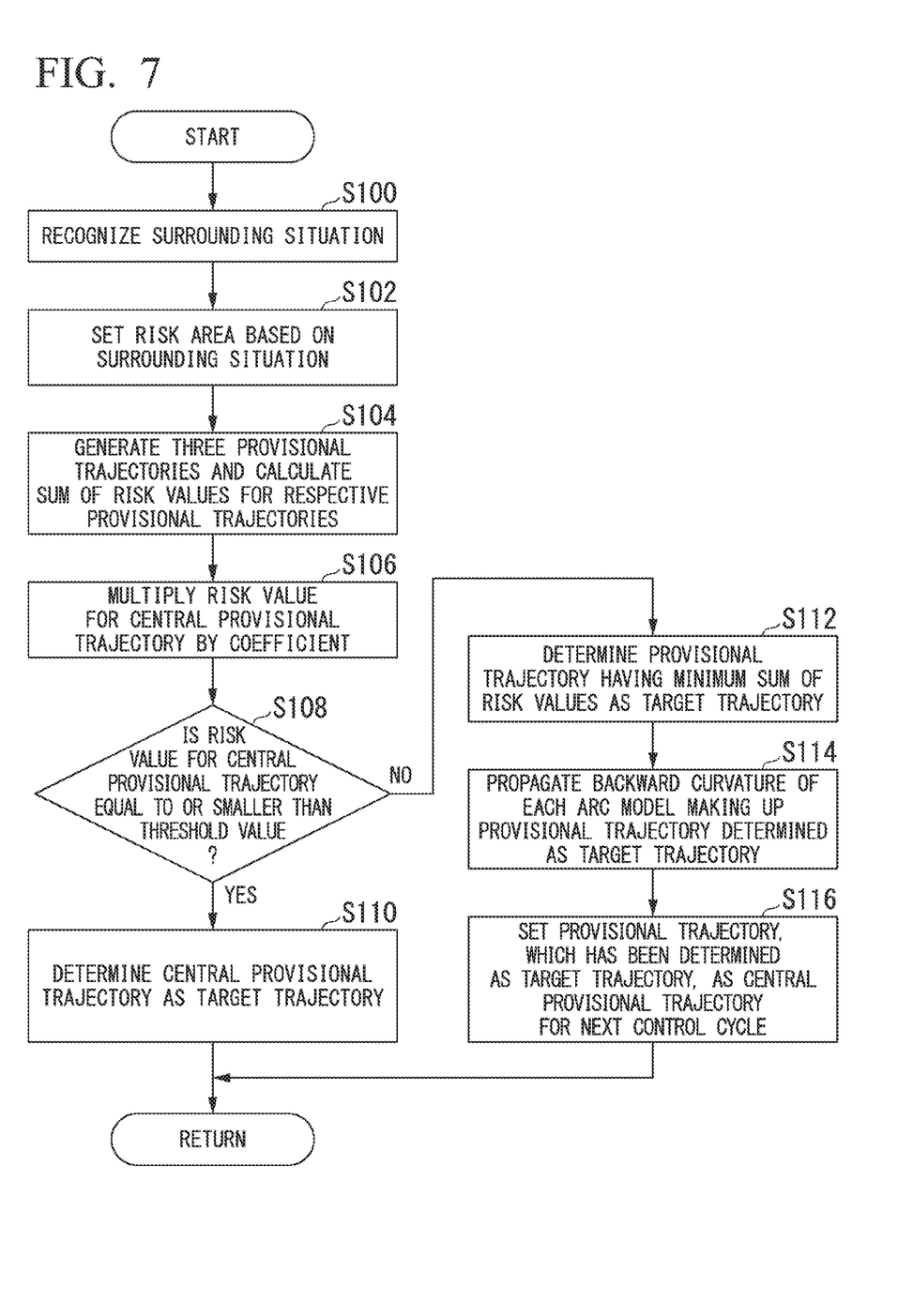
FIG. 7 is a flow chart illustrating an exemplary flow of processing to be executed by the mobile object control device according to an embodiment.

Next, referring to FIG. 7, description is given of the flow of processing to be executed by the mobile object control device according to this embodiment. FIG. 7 is a flow chart illustrating an exemplary flow of processing to be executed by the mobile object control device according to an embodiment. The processing in this flowchart is repeatedly executed by the mobile object control device in predetermined control cycles.

First, the recognizer 130 recognizes the surrounding situation of the host vehicle M based on the information obtained from the object recognition device 16 (Step S100). Next, the risk area setter 132 sets the risk areas based on the surrounding situation recognized by the recognizer 130 (Step S102). Then, the action plan generator 140 generates three provisional trajectories using the previous control cycle's target trajectory as the central provisional trajectory, and calculates the sum of risk values for respective generated provisional trajectories (Step S104).

Next, the action plan generator 140 multiplies the coefficient for reducing the risk value calculated for the central provisional trajectory by the risk value (Step S106). Next, the action plan generator 140 determines whether the risk value for the central provisional trajectory is equal to or smaller than a threshold value (Step S108). If it is determined that the risk value for the central provisional trajectory is equal to or smaller than the threshold value, the action plan generator 140 determines the central provisional trajectory as the target trajectory for the current control cycle (maintaining the setting as the target trajectory) (Step S110).

On the other hand, if it is determined that the risk value for the central provisional trajectory is larger than the threshold value, the action plan generator 140 selects the provisional trajectory having the smallest total risk value from among the provisional trajectories, and determines the selected provisional trajectory as the target trajectory (Step S112). Next, the action plan generator 140 propagates backward the curvature of each arc model making up the provisional trajectory determined as the target trajectory (Step S114). Next, the action plan generator 140 sets the provisional trajectory, which has been determined as the target trajectory, as the central provisional trajectory for the next control cycle (Step S116). This completes the processing of this flowchart.

The embodiment described above involves recognizing a surrounding situation of a mobile object; setting, based on the recognized surrounding situation, a risk area in which positions of the surrounding situation are associated with risk values that are indicator values indicating degrees to which the mobile object is to avoid traveling; generating a target trajectory indicating a route along which the mobile object is to travel in the future; causing the mobile object to travel along the generated target trajectory; and setting at least one observation point in each of three or more provisional trajectories branching at a specific location ahead of the mobile object, and generate the target trajectory based on the risk area and the at least one observation point. As a result, it is possible to generate a target trajectory optimal for a mobile object.

The above-mentioned embodiment can be expressed in the manner.

A mobile object control device including a storage medium storing computer-readable commands, and a processor connected to the storage medium, the processor being configured to execute the computer-readable commands to: recognize a surrounding situation of a mobile object; set, based on the recognized surrounding situation, a risk area in which positions of the surrounding situation are associated with risk values that are indicator values indicating degrees to which the mobile object is to avoid traveling; generate a target trajectory indicating a route along which the mobile object is to travel in the future; cause the mobile object to travel along the generated target trajectory; and set at least one observation point in each of three or more provisional trajectories branching at a specific location ahead of the mobile object, and generate the target trajectory based on the risk area and the at least one observation point.

This concludes the description of the embodiment for carrying out the present invention. The present invention is not limited to the embodiment in any manner, and various kinds of modifications and replacements can be made within a range that does not depart from the gist of the present invention.

What is claimed is:

1. A mobile object control device comprising a storage medium storing computer-readable commands, and a processor connected to the storage medium, the processor being configured to execute the computer-readable commands to:
 recognize a surrounding situation of a mobile object;
 set, based on the recognized surrounding situation, a risk area in which positions of the surrounding situation are associated with risk values that are indicator values indicating degrees to which the mobile object is to avoid traveling;
 generate a target trajectory indicating a route along which the mobile object is to travel in a predicted future;
 cause the mobile object to travel along the generated target trajectory; and
 set at least one observation point in each of three or more provisional trajectories branching at a specific location ahead of the mobile object, and determine the target trajectory from among the three or more provisional trajectories based on the risk area and a risk value of the at least one observation point.

2. The mobile object control device according to claim 1, wherein the processor sets, as the three or more provisional trajectories, at least one provisional trajectory in a travel direction of the mobile object and two provisional trajectories on left and right sides with respect to the travel direction.

3. The mobile object control device according to claim 2, wherein the processor generates the two left and right provisional trajectories as arcs with respect to the provisional trajectory set in the travel direction of the mobile object.

4. The mobile object control device according to claim 3, wherein the processor changes lengths of the arcs according to a speed of the mobile object.

5. The mobile object control device according to claim 1, wherein the processor determines, from among the three or more provisional trajectories as the target trajectory based on the set risk area, a provisional trajectory including an observation point having the smallest risk value among the at least one observation point.

6. The mobile object control device according to claim 5, wherein the processor repeats the cycle of setting the determined target trajectory as a center provisional trajectory of the three or more provisional trajectories and generating left and right provisional trajectories of the three or more provisional trajectories from the set center provisional trajectory.

7. The mobile object control device according to claim 5,
 wherein the risk value of the center provisional trajectory of the three or more provisional trajectories is multiplied by a coefficient for reducing the risk value, and
 wherein the processor determines, from among the three or more provisional trajectories as the target trajectory based on the set risk area, a provisional trajectory including an observation point having the smallest risk value among the at least one observation point.

8. The mobile object control device according to claim 5, wherein the processor determines the center provisional trajectory as the target trajectory if the curvature of the center provisional trajectory among the three or more provisional trajectories is equal to or smaller than a threshold value.

9. A mobile object control device comprising a storage medium storing computer-readable commands, and a processor connected to the storage medium, the processor being configured to execute the computer-readable commands to:
 recognize a surrounding situation of a mobile object;
 set, based on the recognized surrounding situation, a risk area in which positions of the surrounding situation are associated with risk values that are indicator values indicating degrees to which the mobile object is to avoid traveling;
 generate a target trajectory indicating a route along which the mobile object is to travel in a predicted future;

cause the mobile object to travel along the generated target trajectory; and set one observation point in a travel direction of the mobile object and two observation points on left and right sides with respect to the travel direction of the mobile object, and determines the target trajectory from among three provisional trajectories passing through the three observation points respectively based on the risk area and risk values of the observation points.

10. A mobile object control method to be executed by a computer, the mobile object control method comprising:

recognizing a surrounding situation of a mobile object;

setting, based on the recognized surrounding situation, a risk area in which positions of the surrounding situation are associated with risk values that are indicator values indicating degrees to which the mobile object is to avoid traveling;

generating a target trajectory indicating a route along which the mobile object is to travel in a predicted future;

causing the mobile object to travel along the generated target trajectory; and setting at least one observation point in each of three or more provisional trajectories branching at a specific location ahead of the mobile object, and determine the target trajectory from among the three or more provisional trajectories based on the risk area and a risk value of the at least one observation point.

11. A non-transitory computer-readable storage medium having stored thereon a program for causing a computer to:

recognize a surrounding situation of a mobile object;

set, based on the recognized surrounding situation, a risk area in which positions of the surrounding situation are associated with risk values that are indicator values indicating degrees to which the mobile object is to avoid traveling;

generate a target trajectory indicating a route along which the mobile object is to travel in a predicted future;

cause the mobile object to travel along the generated target trajectory; and set at least one observation point in each of three or more provisional trajectories branching at a specific location ahead of the mobile object, and determine the target trajectory from among the three or more provisional trajectories based on the risk area and a risk value of the at least one observation point.

* * * * *